Jan. 16, 1934.  E. M. DAVIS  1,943,587

BUTTER PACKING

Filed May 20, 1932

Elmer M. Davis
INVENTOR

BY
ATTORNEY

WITNESS

Patented Jan. 16, 1934

1,943,587

UNITED STATES PATENT OFFICE 1,943,587

BUTTER PACKING

Elmer M. Davis, Chicago, Ill., assignor to Swift and Company, Chicago, Ill., a corporation of Illinois Application May 20, 1932. Serial No. 612,425

3 Claims. (Cl. 99—11)

This application is a continuation in part as to common subject matter of my application for United States Letters Patent entitled "Butter separators and indicators," filed September 10, 1931, Serial No. 562,025.

This invention relates to butter packing and especially to butter separators and indicators. A particular object of the invention is to enable patrons of lunch rooms and public dining places to readily ascertain the source of the butter.

Another object of the invention is to provide a print of butter divided into individual service chips which may be readily broken down into its several component parts at the time and place of service, so assembled that each chip may be readily separated from the adjacent chip, each chip being provided with a separator which permits such separation, which separator also acts as an indicator and is not readily removable from the chip to which it is attached.

It will be seen that the present invention facilitates the separation of butter into pieces or chips of uniform size for individual service by the caterer or other dispenser, without necessitating recourse to the use of a knife or other form of cutter.

The product of the present invention consists essentially of a cake or unit of butter subdivided into squares, cubes or chips of desired shape and size and separated by spacers of thin sheet material such as paper, placed between the individual pieces.

The trade mark or other indicia of the manufacturer, innkeeper or the like may be imprinted on the spacers.

The nature and advantages of the invention will appear more fully from the following description and accompanying drawing in which corresponding and like parts are designated by similar reference characters.

Referring to the drawing.

Figure 1:
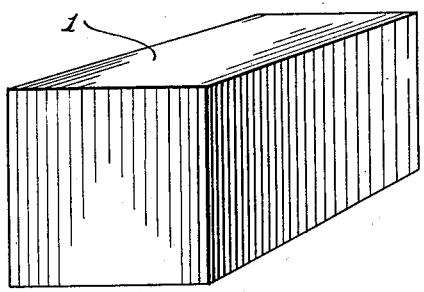
Figure 1 is a perspective view of a cake or unit of butter.
Figure 2:
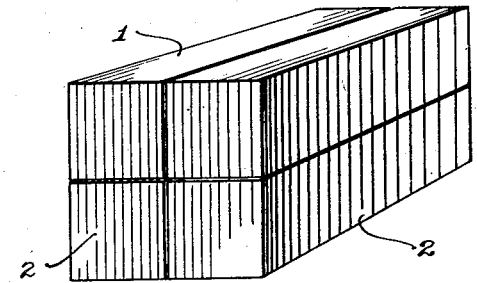
Fig. 2 is a view similar to Fig. 1, showing the cake or block of butter subdivided to form a plurality of elongated pieces or sticks.

The numeral 1 designates a cake or unit of butter of predetermined size and usually weighing one pound. This cake or unit of butter is subdivided longitudinally to form elongated pieces or sticks 2, each weighing one-quarter pound.

The cake or unit of butter, after being longitudinally subdivided, is further subdivided to provide squares, chips or pieces 3 of predetermined size for individual service, and these chips or pieces 3 are prevented from adhering by interposed separators 4 which consist of thin sheet material such as paper. The separators 4 are interposed between the slices and are of a size conforming to the cross sectional outline of the cake or unit 1. Break lines 5 divide each separator 4 to facilitate the parting of the separator when breaking the slice of butter to form the four pieces, chips or squares 3. The break lines 5 may consist of perforations or cuts to facilitate the separation of the spacer when parting the slice to form the individual service pieces or chips 3. The break lines 5 coincide with the cuts separating the sticks or elongated pieces 2.

Figure 4:
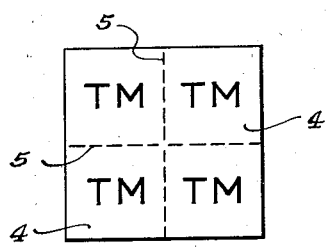
Fig. 4 is an elevational view of a separator.
Figure 3:
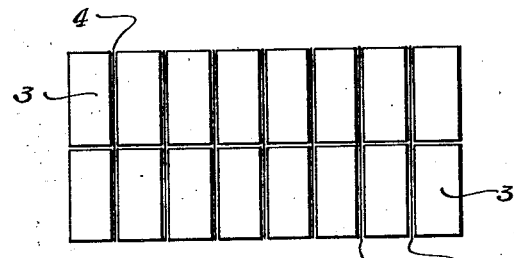
Fig. 3 is a top plan view of the cake or unit of butter further subdivided to form the pieces or chips for individual service and separated by spaces in accordance with the invention.

The separators may conform to the outline of the cake or unit 1, as indicated most clearly in Fig. 4 of the drawing, or they may be formed with extensions 6 which constitute flaps to be engaged by the fingers of the hand to facilitate the separation of the chips or slices when separating the cake or unit into the individual service pieces. It should be remembered that each slice of the cake or unit 1 of butter represents four squares or chips, and in order that the brand of the butter may be identified, each separator is provided with an insignia, trade mark or other indication, indicative of the brand so that the patron may be duly informed as to the character of butter served.

The trade mark or other brand identification may be imprinted or otherwise provided upon the separator and the arrangement is such that each chip or individual service of butter is provided with a separator bearing the brand identification.

Figure 6:
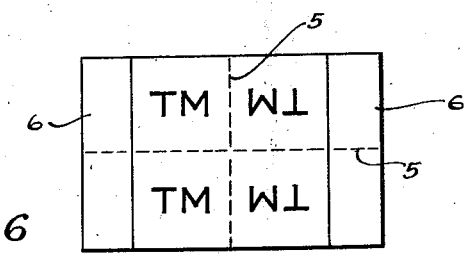
Fig. 6 is an elevational view of the modified form of separator employed in the arrangement illustrated in Fig. 5.

In the form of separator illustrated in Fig. 6, the extensions 6 project beyond the sides of the cake or unit so as to be readily grasped to facilitate the separating of the slices, the latter being further separated to form the chips or pieces 3, this being facilitated by the break lines 5 and by the preliminary longitudinal cuts dividing the cake or unit 1 into the elongated pieces or sticks 2.

In Figures 4 and 6, of the drawing, the letters TM represent a trade mark or other indicia which may be placed upon the separators in accordance with the teaching of the present invention. The separators 4 are preferably manufactured from parchment paper of the type conventionally used in wrapping print butter. After the trade mark or other indicia is printed on one side of the paper, the side upon which the printing appears is waxed, the other side being left unwaxed. Butter will adhere to a waxed surface but will not adhere to the unwaxed surface of parchment paper. Consequently, the chip of butter adjacent the waxed surface will adhere to the separator, whereas the chip of butter adjacent the unwaxed surface will fall away without adhesion. The adhesion of the waxed surface is not affected by water or ice and, consequently, the piece of paper adhering to each individual piece of butter, after being placed, for example, in a large butter chip bowl in a restaurant or dining car, with cracked ice, will not come away from the chip and will remain thereon until the butter is removed by the diner. The diner, upon removing the chip of butter from the separator, will see the trade mark or indicia, thus providing very advantageous advertising.

Figure 5:
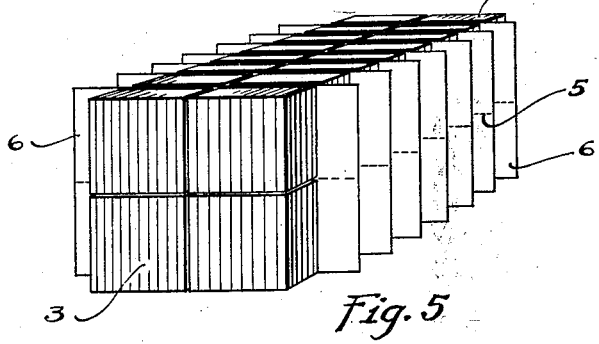
Fig. 5 is a perspective view of a cake or unit of butter having the chips, squares or individual pieces separated by a modified form of spacer.

In the modifications of the invention shown in Figures 5 and 6, the extensions 6 serve as means to facilitate handling by the fingers without touching the butter during service.

It will be understood that "butter" as used in this specification and the claims which follow is a broad term which includes all fatty spreads for bread and the like such as dairy butter, oleomargarine and the like. It will be further understood that the term "parchment paper" includes true parchment, imitation parchment, and like material.

I claim:

1. A cake of butter subdivided into chips or pieces for individual service, and separators interposed between the chips or pieces to facilitate separation when required, said separators being waxed on one side and unwaxed on the other.

2. A cake of butter subdivided into chips or pieces for individual service, and separators interposed between the chips or pieces, said separators being waxed on one surface, said separators being divided by break lines coinciding with the longitudinal cuts.

3. A cake of butter subdivided into chips or pieces for individual service, and separators interposed between the chips or pieces, said separators being waxed on one surface, said separators being divided by break lines coinciding with the longitudinal cuts and having extensions to provide finger grasps.

ELMER M. DAVIS.